W. PARKES.
ROTATING MECHANISM FOR CAMERAS AND THE LIKE.
APPLICATION FILED MAR. 29, 1916.
1,259,126.
Patented Mar. 12, 1918.
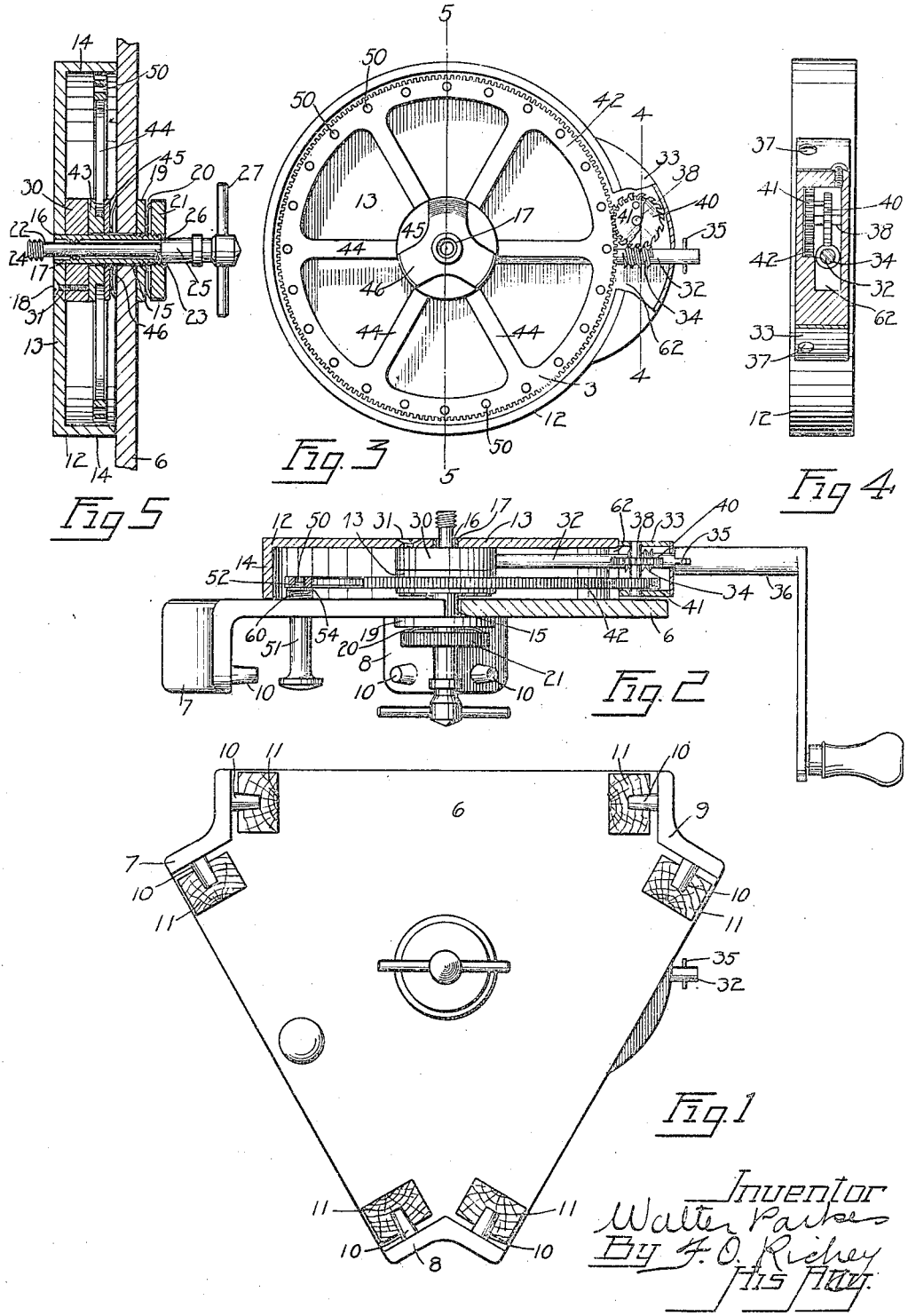
Inventor
Walter Parkes
By F. O. Richey
His Atty.

UNITED STATES PATENT OFFICE.

WALTER PARKES, OF ELYRIA, OHIO, ASSIGNOR TO ARTHUR L. GARFORD, OF ELYRIA, OHIO.

ROTATING MECHANISM FOR CAMERAS AND THE LIKE.

1,259,126.  Specification of Letters Patent.  Patented Mar. 12, 1918.

Application filed March 29, 1916. Serial No. 87,413.

*To all whom it may concern:*

Be it known that I, WALTER PARKES, a subject of the King of England, residing at Elyria, in the county of Lorain and State of Ohio, have invented certain new and useful Improvements in Rotating Mechanism for Cameras and the like; and I do hereby declare the following to be a full, clear, and exact description of the invention, such as will enable others skilled in the art to which it appertains to make and use the same.

My invention relates to rotating mechanisms, such as turn tables, for cameras and the like, and relates more particularly to devices of this character intended to take panoramic motion pictures, or motion pictures of objects which are traveling, and for other similar purposes.

One of the objects of my invention is to provide means for fastening the camera to the frame of the mechanism without jamming the gears employed in any way, or in any way interfering with the operation of such gears.

I also aim to provide means through which I can secure a suitable pressure between the stationary and rotatable parts of the mechanism and maintain such pressure during the operation of the device.

I also aim to produce a device in which means are utilized for preventing accidental movements of the mechanism and of the turn table.

I aim to provide means which will take up any play among the gears, so as to prevent the camera being accidentally moved.

Smoothness of operation and cheapness of construction are other objects of my invention.

Another object of my invention is to provide mechanism of the character described, in which the means for operating the turn table rotates with the turn table, so as to maintain a constant relation with the camera and with the means employed for operating the camera itself.

I also aim to provide mechanism of the type described in which the revolving top of the turn table may be quickly released from the other parts of the mechanism.

Other objects of my invention and the invention itself will probably be better understood from a description of the embodiment of the device shown.

Figure 1 is a bottom plan view of the mechanism.

Fig. 2 is a side elevation showing portions of the device in section.

Fig. 3 is a plan view with the turn table proper removed.

Fig. 4 is a section on the line 4—4 of Fig. 3, and

Fig. 5 is a section on the line 5—5 of Fig. 3.

Referring now to the drawing and to the embodiment of the invention illustrated, at 6 is shown the base plate or frame, which in the form shown is triangular in shape, provided with depending ears 7, 8 and 9, one on each corner. These ears are provided with pins 10, through which legs 11 may be connected to the mechanism, and upon which it is supported when used. Any suitable number of legs may be used. In the form shown six are employed. The ears 7, 8 and 9 may be of any suitable shape. In the form shown they are angularly shaped. The rotary member or turn table is shown at 12. In the form shown, this member is shaped like a shallow cup, the bottom 13 serving as a support for the camera or other object which is employed in connection with the mechanism, and the sides 14 extend over the apparatus employed for rotating the same, as illustrated in Figs. 2 and 5. Means are provided for connecting the turn table and base plate together. An opening 15 is provided in the base plate preferably near the center thereof, and a corresponding opening 16 is formed in the top of the turn table 15. A hollow sleeve shaft 17 extends through these openings and through the interior of the turn table. The shaft 17 is connected to the turn table by means which will be described, so that the turn table rotates with the shaft, whereas the shaft rotates freely in the opening 15 in the plate 6.

A plurality of threads 18 are formed on the interior of the member 17 for a purpose to be described. A bearing surface 19 is loosely mounted upon the exterior of the hollow shaft 17, being screwed down against the surface of the base plate 6. Resilient yielding means 20, here shown as a star leaf spring is placed over the shaft 17 next to the bearing surface 19, and a nut 21, preferably a knurled nut, is threaded upon the shaft 17 against the spring 20. The connecting means proper is shown at 22, and here consists of a pin 23 provided upon one end with suitable means for engaging the camera or other object to be mounted upon the turn table. In the form shown, threads are employed which are adapted to coöperate with companion threads upon the camera. The pin is provided with a hub 25 and a shoulder 26. The shoulder 26 is adapted to bear against the end of the hollow shaft 17. The member 22 is also provided with a cross pin 27.

When it is desired to connect the camera to the turn table, the pin is inserted through the bore of the hollow shaft 17, the threads 24 being threaded through the threads 18 in the shaft. It will be seen that the pin will not be released when detached from the camera, but will only drop back until the threads 24 engage the threads 18. The camera may be fastened tightly to the turn table without danger of injuring the mechanism, since should the pressure become too great, the spring 20 will yield. Moreover, this spring will always tend to force the member 22 downwardly, thereby keeping the camera tight upon the turn table and preventing any play between the camera and the turn table.

The apparatus for rotating the object upon the turn table in azimuth consists of the following mechanism—a head 30 is mounted about the hollow shaft 17 upon the interior of the bottom 13 of the turn table, being fastened thereto by any suitable means, such as screws 31. This head furnishes a bearing for a shaft 32 which passes through the interior of the turn table and through a gear box 33 mounted upon one side of the turn table. The side walls 14 of the member 12 is provided with an opening 62 through which the gear box communicates with the interior of the member 12. The shaft 32 is provided with a worm 34 upon the portion which passes through the turn table, and with suitable means for connecting it to a driving device, here shown as a pin 35 adapted to engage with an ordinary hand crank shown at 36 in Fig. 2, through the well known slot and pin connecting means. The gear box is connected by any suitable means to the turn table, such as screws 37 and rotates with the turn table.

There is mounted in the gear box a stud shaft 38 journaled in the top and bottom of the box and upon this shaft is mounted a worm wheel 40 provided with teeth for engaging with the teeth upon the worm. There is also mounted upon the shaft a gear wheel 41 provided with teeth for coöperating with a driving wheel 42. Teeth are formed upon the periphery of the driving wheel which coöperate with the teeth upon the wheel 41. The drive wheel is journaled to rotate freely upon the shaft 17 and is provided with a hub 43 and a plurality of spokes 44. A plate 45 is connected to the wheel, being preferably rigidly fastened thereto, which forms a bearing surface for a second star leaf spring 46, which bears at one side against the plate 45 and at the other against the base plate 6. This spring serves to keep the main wheel in position, and owing to the pressure it constantly maintains against the main wheel to prevent any accidental movement of said wheels, due to any play between the teeth of the gears, either as rigidly constructed or as afterward worn, thereby preventing any accidental movement of the camera or other object supported by the turn table.

The spring 46 is suitably tensioned and can be regulated so as to maintain the desired pressure at all times. The wheel 42 is provided with a plurality of openings 50, preferably near the periphery thereof. A lock pin 51 is used to coöperate with said openings to lock the wheel in any desired position. The pin projects through an opening in the plate 6. A point 52 upon the pin is of suitable size to enter the openings 50. A collar 54 is provided upon the pin to prevent it being withdrawn or falling out of the opening in the base plate. A spring 60 is employed which tends always to keep the pin in operative position. When the crank 36 is rotated, the wheel 41 will be rotated through the worm and worm gear. This will tend to rotate the wheel 42, but this being previously locked at a desired position by the pin 51, the wheel will not rotate, but the turn table will be rotated, carrying with it the camera or other object thereon and the crank 36, the relation between the camera and its various parts and the crank being maintained the same, so that if a person is operating the crank for driving the camera mechanism and also the crank for driving the turn table, these members will always be convenient to him.

I have illustrated and described this particular embodiment of my invention and the particular details thereof, not that I wish to be limited to the same, but for the purpose of better describing the invention, it being apparent to those skilled in the art that numerous and extensive departures may be made both from the form and details illustrated, without departing from the spirit of the invention.

I claim:—

1. In a turn table apparatus for motion picture cameras and the like, the combination of a base plate and a turn table rotatably mounted on said plate, mechanism including a wheel through which said turn table is rotated, means for locking said wheel in any desired position and means for rotating said turn table through said mechanism, said last named means being mounted on and rotatable with said turn table.

2. In a turn table apparatus for motion picture cameras and the like, the combination of a base plate, a turn table rotatably mounted on said base plate, mechanism through which said turn table is rotated, including a gear wheel, a drive shaft and intermediate gear means, a device for locking said wheel in any desired position and means through which said shaft and turn table are operated, said means being movable with said turn table.

3. In a turn table apparatus for motion picture cameras and the like, the combination of a base plate, a turn table rotatably mounted on said base plate, a large gear wheel rotatably mounted on said base plate, means for rotating said turn table mounted on the turn table, gear mechanism intermediate said gear wheel and said means and a locking device for locking said gear wheel in any desired position.

4. In a turn table apparatus for motion picture cameras and the like, the combination of a base plate, a turn plate on said base plate, a shaft passing through an opening in the plate and turn table by which the turn table is rotatably mounted with the shaft, a gear wheel loosely mounted upon the shaft provided with a plurality of openings, a locking pin passing through the base plate adapted to engage said wheel in any of said openings to lock the wheel in position, a drive shaft journaled in the turn table and movable therewith, gear means intermediate said shaft and said wheel and apparatus movable with said turn table for driving said shaft.

5. In a turn table apparatus for motion picture cameras and the like, the combination of a base plate, a turn table, means for driving the turn table, a train of gears intermediate said means and said turn table and yielding means for preventing involuntary movement between said turn table and said base plate.

6. In turn table apparatus for motion picture cameras or the like, the combination of a base plate, a turn table rotatably mounted on said base plate, driving means for said turn table, a train of gears intermediate said turn table and said driving means and a star leaf spring for preventing accidental movements between said base plate and said turn table.

7. In turn table apparatus for motion picture cameras and the like, the combination of a base plate, a turn table on said base plate, a shaft on which the turn table is mounted, means for driving the turn table, a train of gears intermediate said means and the turn table, including a gear wheel loosely mounted on said shaft, and yielding means acting upon said gear wheel to prevent accidental movement between said turn table and said base plate.

8. In turn table apparatus for motion picture cameras or the like, the combination of a base plate, a turn table member and a shaft connected to the turn table member passing through an opening in the base plate, driving means for the turn table, a gear wheel loosely mounted on said shaft, gear means between said gear wheel and said driving means and a star leaf spring on said shaft between said gear wheel and said base plate, said spring being normally under tension.

9. In a turn table apparatus for motion picture cameras and the like, the combination of a base plate, a turn table and means for maintaining a yielding pressure of a predetermined force between said plate and turn table.

10. In a turn table apparatus for motion picture cameras and the like, the combination of a base plate provided with an opening, a turn table on said base plate, a shaft fastened to the turn table and projecting through the opening in the base plate and rotatable in said opening, the end of the shaft projecting below the base plate, such projecting portion being threaded, a nut on the threaded portion of said shaft and a flat star spring between said nut and said base plate whereby a yielding pressure of a predetermined force may be established and maintained between said plate and turn table.

11. In a turn table apparatus for motion picture cameras and the like, the combination of a turn table and a base plate and means including a flat star spring for establishing and maintaining a pressure of a predetermined force between said plate and said turn table.

In witness whereof I have signed my name hereunto this 27 day of March, 1916.

WALTER PARKES.

Copies of this patent may be obtained for five cents each, by addressing the "Commissioner of Patents, Washington, D. C."